Aug. 27, 1968  H. W. WEGENER ET AL  3,398,873

SUMPS AND NOZZLES FOR SOLDERING MACHINES

Filed Sept. 7, 1966

INVENTORS.
H. W. WEGENER and
K. G. BOYNTON

BY *Aaron Feinberg*
ATTORNEY.

United States Patent Office 3,398,873
Patented Aug. 27, 1968

3,398,873
SUMPS AND NOZZLES FOR SOLDERING MACHINES
Howard W. Wegener, Wilton, and Kenneth G. Boynton, Milford, N.H., assignors to Hollis Engineering, Inc., a corporation of New Hampshire
Filed Sept. 7, 1966, Ser. No. 577,669
10 Claims. (Cl. 228—37)

This invention relates to mass soldering machines and more particularly to sumps, nozzles and sluices used in such machines in connection with the soldering and wiring of electric circuits, printed circuits, radio, television and various types of commercial soldering and tinning.

In present soldering machines using a mixture of oil and solder, stored in a common reservoir of solder with a layer of oil floating on top of the solder, great difficulty is experienced by the waterfall action of the overflow of the heavy solder from the nozzle of the machine splashing directly into the top layer of oil. This causes the floating oil to be churned up and become filled with air bubbles producing objectionable foam.

It is the object of this invention to discharge from the nozzle of a mass soldering machine, a high vertical wave with a smooth horizontal crest of solder alone, or one mixed with an extremely accurately measured amount of oil and free from air bubbles or dross. To get the required results, air should be kept from immediate contact with the deposited solder until the joint has solidified.

A further object of our invention is to prevent the heavy solder overflow from the nozzle from falling directly into and through the top layer of oil, thus preventing the overflow from picking up additional oil as it passes through the oil layer which makes it difficult to accurately control the required oil content in the solder oil wave, which is very important for dependable work.

As the efficiency and practical utility of present machines of this type varies directly with the height of the wave, the higher the wave, the greater the present difficulties when attempting to produce a high smooth wave of good quality.

In accordance with our invention there is produced a mass soldering machine which is efficient and reliable. It is versatile as it can produce waves of solder and oil or solder alone interchangeably, depending on the requirements of the final product. It produces smoother workable waves higher than those produced by other machines available at the present time. It reduces cleaning and maintenance problems now associated with the continued use of hot solder and oil flowing over rough surfaces. It allows more accurate and continuous control of the amount of oil to be inserted into the wave by the elimination of extra oil pick-up.

Other objects and a fuller understanding of the invention will hereinafter appear from the following description of a preferred embodiment illustrative of the invention and shown in the accompanying drawings in which.

Figure 1:
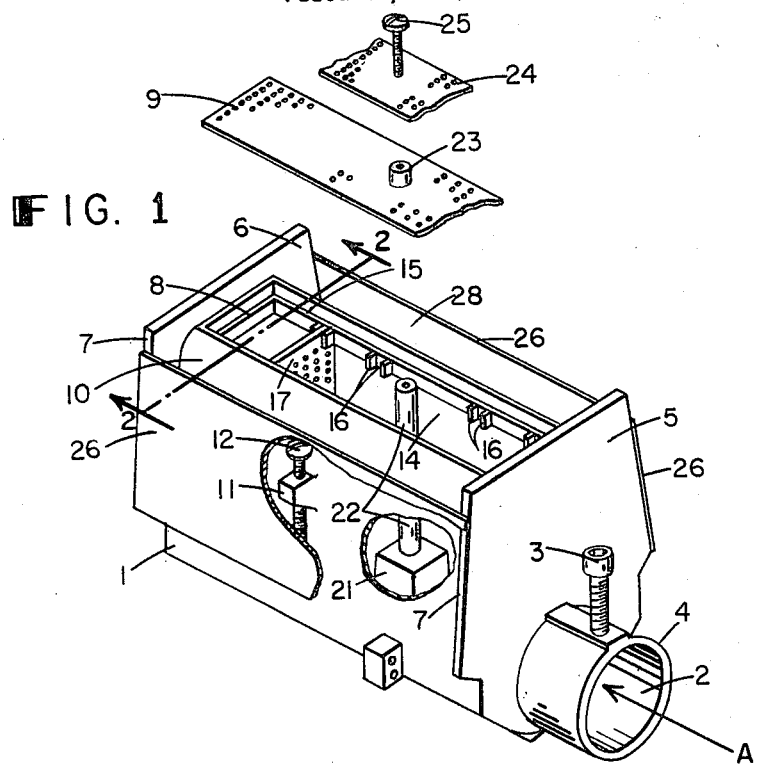
FIG. 1 is a view in perspective of the sump showing certain parts removed and also the interior of the sump partly broken away.
Figure 2:
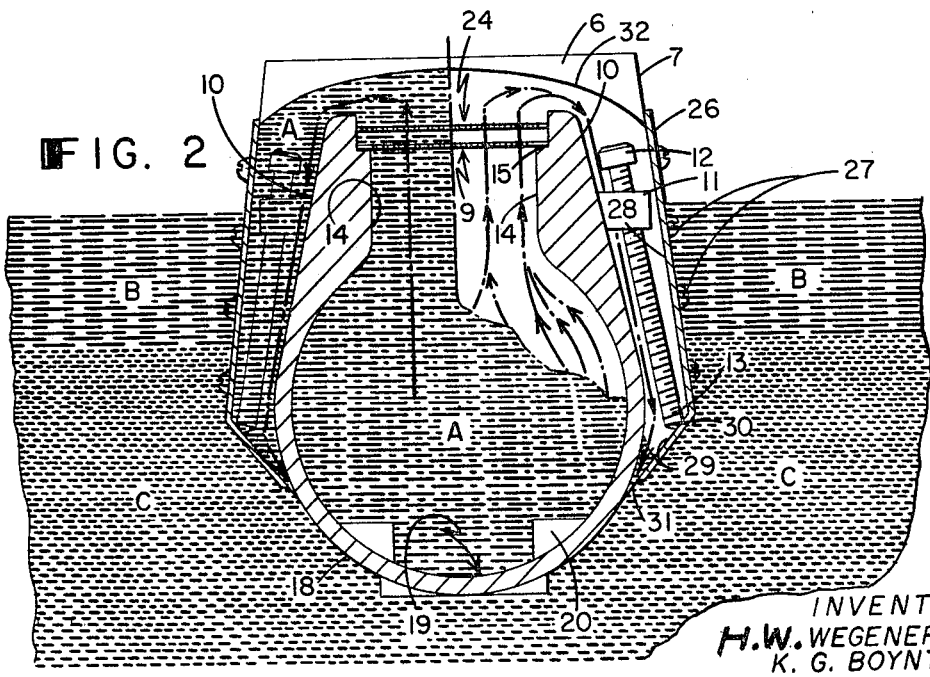
FIG. 2 is a transverse section taken on line 2—2 of FIG. 1.

Our invention consists of a sump partially submerged in a reservoir containing a bottom layer of solder with a layer of oil floating on top. The sump has an intake orifice connected to a pump which forces a mixture of solder and oil into it. The amount of oil introduced into the pump may, when required, be accurately regulated from zero to a maximum flooding condition. The interior of the sump is a mixing chamber provided with a series of vertical perforated screens. The interior and exterior surfaces of the sump are completely ceramic coated.

In other machines an oil residue bakes on the interior surfaces of the sump due to the roughness of the castings and, as it increased, the surfaces became irregular, resulting in an erratic wave as the oil and solder had to pass over these rough surfaces. The ceramic coated sump eliminates these problems by keeping these surfaces clean and smooth, thus this ceramic coating is a vital and necessary part of the invention.

The top of the sump forms the nozzle and is provided with a multiplicity of horizontal perforated screens necessary to produce a high smooth wave. On the exterior of both sides of the sump there are sluice plates positioned from the sides of the sump to form sluices with adjustable sluice gates at their lower discharge orifices.

Referring to the drawings, the combination sump, nozzle, sluices and sluice gates shown therein, as illustrative of one embodiment of our invention comprises a sump body 1, with an intake orifice 2 and a set screw 3 positioned in an extension pipe 4 for connecting the sump with a variable speed pump and for adjusting the tilt of the sump and nozzle. The sump 1, with all surfaces completely ceramic coated has lateral ends with exterior surfaces 5, interior surfaces 6, and side edges 7. The interior surface 6 is provided with a lip 8 for positioning a lower horizontal perforated screen 9. The exterior surfaces 10 of the longitudinal sides are provided with threaded boss extensions 11 for positioning adjusting screws 12 having contacting ends 13. The interior surfaces 14 of the longitudinal sides are provided with supporting lips 15 cooperating with supporting lips 8 for holding a lower horizontal screen 17. The sump 1 has a rounded bottom with an exterior surface 18 and an interior surface 19 provided with lower protruding guides 20 cooperating with guides 16 to position the vertical screens 17. The interior of the sump with the vertical screens positioned transverse to the line of flow of an incoming mixture of oil and solder, operates to continue the required mixing action.

Extending upwardly from the inside surface 19 of the bottom is a boss 21 for holding a supporting post 22 which carries a horizontal screen 24, all secured to post 22 by a screw 25. The sluice plates 26 on each side of the sump 1 are attached to the edges 7 of the lateral ends by screws 27. Each of the plates 26 has a long arm with an inside surface 28 and a resilient short arm with an inside surface 29.

In the interior assembly, the post 22 is screwed into the boss 21. The vertical perforated screens 17 are dropped into place between the upper positioning guides 16 and the lower positioning guides 20. The lower horizontal screen 9 is placed on the supporting lips 8 and 15. The upper horizontal screen with a separator 23 positioned between the screens 9 and 24 and at their centers are all fastened to the post 22 by the screw 25. These horizontal screens are transverse to the line of discharge from the nozzle.

In the exterior assembly of the sluices, the positioning screws 12 extending above the level of the top surface of the layer of oil, are screwed into the bosses 11. The sluice plates 26 are fastened to the side edges 7 of the lateral ends by screws 27. The contacting ends 13 of the screws 12 are brought into contact with the surface 29 at the point 30 thus providing sluice gates with regulated discharge orifices.

In typical operation, the solder and oil output A from the pump passes through the vertical perforated screens 17, rises through the vertical sides of the inner surfaces 14, through the horizontal perforated screens 9 and 24, and cascades over the sides 10 with a crest approximately as shown by the line 32. The overflow then passes into the exterior sluices formed by the outside surfaces 10, the inside surfaces 28 and 29 and the inside surfaces 6 of the both ends 5, carrying the overflow in said sluice through the oil layer B and out at 31 into the solder layer C, where the oil in the mixture separates from the solder and rises to the surface.

The width of the bottom openings of each of the sluice gates, that is each of the slots 31, are then adjusted by means of the screws 12 in cooperation with the resilient short arms 29 until the rate of flow through each of the sluices is exactly equal to the flow over the contiguous side of the sump, thus maintaining a constant level in each sluice, completely eliminating the tumbling waterfall type of overflow of solder and oil.

While the preferred embodiment of our invention has been described in detail, it will be understood that we do not wish to be limited to the particular construction set forth, since various changes in the form, materials, proportions and arrangements of parts and in the detail of construction may be resorted to without departure from the spirit and scope of the invention, or destroying any of the advantages contained in the same, heretofore described, and defined in the following claims.

We claim:

1. In a mass fountain soldering machine using a mixture of solder and oil and having a sump and nozzle adapted to be partially submerged in a reservoir containing a bottom layer of solder with a layer of oil floating thereon, an exterior sluice adapted to collect the overflow from said nozzle and conduct said mixture of oil and solder within the interior of said sluice through the said layer of oil exterior to said sluice, discharging said mixture into said bottom layer of solder.

2. A soldering machine as specified in claim 1 in which said sluice comprises the exterior surface of said sump and a sluice plate positioned therefrom, said exterior surface and said sluice plate extending between the ends of said sump.

3. A soldering machine sump as specified in claim 1 in which said sluice is provided with adjustable means to regulate the flow through said sluice, said adjustable means consisting of a sluice gate positioned at the discharge end of said sluice.

4. A soldering machine as specified in claim 1, the interior and exterior surfaces of said sump being completely ceramic coated.

5. In a mass soldering machine using a regulated mixture of solder and oil, a combination sump, nozzle and overflow sluices adapted to be partially submerged in a reservoir containing a bottom layer of solder exterior to said sluices and a top layer of oil floating thereon, means for thoroughly mixing an intake of oil and solder within said sump, means for forming and guiding the upward discharge of a high vertical wave with a smooth horizontal crest consisting of solder and oil flowing from said nozzle, and means for collecting the overflow from said wave and conducting said overflow mixture of solder and oil undiluted through said exterior floating layer of oil and discharging said mixture directly into said layer of solder.

6. A soldering machine as specified in claim 5, in which said mixing means comprises a mixing chamber having a multiplicity of vertical perforated screens positioned transverse to the line of flow of an incoming mixture of solder and oil pumped into said chamber.

7. A soldering machine as specified in claim 5, in which said nozzle means comprises a nozzle positioned above a mixing chamber, said nozzle having vertical sides and vertical ends and provided at the upper end of its horizontal orifice with a multiplicity of horizontal perforated screens positioned transverse to the line of discharge from said nozzle.

8. A soldering machine as specified in claim 5, in which said overflow collecting means comprises an exterior sluice positioned from the exterior sides of said sump.

9. A soldering machine as specified in claim 5, in which said overflow collecting means comprises sluice plates positioned from the exterior sides of said sump and between the inside surfaces of the ends of said sump.

10. A soldering machine as specified in claim 5, in which said overflow collecting means comprises exterior sluices provided with adjustable gates to regulate the flow through said sluices.

References Cited

UNITED STATES PATENTS

| | | | |
|---|---|---|---|
| 3,303,983 | 2/1967 | Patrick et al. | 228—37 |
| 3,037,274 | 6/1962 | Hancock | 228—37 |

RICHARD H. EANES, Jr., *Primary Examiner.*